REFERENCE PLANE CARD CONNECTOR SYSTEM

Filed Nov. 4, 1964

INVENTORS.
ELTON CONRAD,
JAMES C. CRAIG,
BY Walter J. Odam
ATTORNEY.

Aug. 1, 1967 E. CONRAD ETAL 3,334,325

REFERENCE PLANE CARD CONNECTOR SYSTEM

Filed Nov. 4, 1964

2 Sheets-Sheet 2

INVENTORS.
ELTON CONRAD,
JAMES C. CRAIG,
BY
Walter J. Adam
ATTORNEY.

United States Patent Office 3,334,325
Patented Aug. 1, 1967

3,334,325

REFERENCE PLANE CARD CONNECTOR SYSTEM

Elton Conrad, Anaheim, and James C. Craig, Yorba Linda, Calif., assignors to Hughes Aircraft Company, Culver City, Calif., a corporation of Delaware Filed Nov. 4, 1964, Ser. No. 408,950
7 Claims. (Cl. 339—14)

ABSTRACT OF THE DISCLOSURE

A connector, for a printed circuit card which is removably positioned in a mounting structure. The printed circuit card includes a reference plane of conductive material that is electrically connected to an elongated bus bar by a plurality of pins. An elongated spring sheet of conductive material is fixed to the mounting structure and contacts the bus bar, when the card is inserted into the connector, to provide a reference potential.

This invention relates to electrical connectors and particularly to an improved connector system for printed or etched circuit cards or boards useful in computers operating at relatively high clock rates.

Conventional printed circuit cards include a reference or ground plane which is connected to bus bars or other sources of reference potential through deposited or etched strips or fingers at the end thereof and through selected contacts of a printed circuit connector structure in which the card is removably retained. Because circuit cards are desirably maintained as narrow in dimensions as possible, the number of connector contacts in a connector structure is limited. When a plurality of connector contacts are utilized for the reference or ground potential, the number of circuit elements that may be provided on a single card is substantially limited. Also, the connecting of the reference or ground potential through the deposited strips, through the connector contacts and through wires between the connector and a reference bus bar or other structure provides a substantially high inductance because of the relatively long length of conducting path. In digital computers, for example, the impedance to ground substantially affects the operation because many electronic circuits on each card may be rapidly switched on or off simultaneously in response to clock pulses. The inductance in the reference or ground path from the circuit components on the card, attenuates the AC (alternating current) signal components, especially at very high frequencies, so as to substantially increase the rise time of pulses. Thus the clock rate is limited to undesirably low values. In some systems utilizing cards, storage capacitors are provided between the DC (direct current) supply voltages and ground potential to supply a portion of the energy during the switching operations and to be recharged between switching times. Unless a low impedance is provided between the storage capacitor and ground to rapidly recharge the capacitor, the clock rate is substantially limited. Thus, in card systems either with or without the storage capacitors, the impedance to ground is highly critical for operation at high speeds because of the switching transients which are developed when switching to and from a plurality of DC supply levels.

It is therefore an object of this invention to provide a simplified and improved arrangement for connecting a voltage level such as on the reference plane of a circuit card to a source of potential such as a source of reference potential.

It is another object of this invention to provide a reference plane connector for a system utilizing printed circuit cards having a reference plane or structure therein.

It is still another object of this invention to provide an electrical connector system useful with a removable circuit card and which develops a relatively small impedance.

It is a further object of this invention to provide a mounting system for a removable printed circuit card that allows a maximum number of circuit elements to be utilized for a predetermined number of connector contacts.

It is a still further object of this invention to provide for use with a printed circuit card which is removably inserted into a connector structure having a plurality of contact points, a ground plane connector also having a movable contact that is substantially independent of the connector structure.

Briefly, the reference or ground plane connector system in accordance with the principles of the invention utilizes a printed or etched circuit card or board having a reference or ground plane therein which is formed from an etched sheet of conductive material. The end of the card is insertable into a connector structure which in turn is positioned on a mounting frame. In one arrangement in accordance with the principles of the invention, a bar of conductive material is positioned on or above the surface of the card and is connected to the ground plane of the card through a plurality of short conductive pins. An elongated spring structure which is attached to the mounting frame adjacent to the connector structure is suitably connected to a reference or ground bus bar structure. When the end of the card is inserted into the connector structure, the elongated spring structure contacts the bar to provide a low impedance connection thereat. The connecting arrangement provides a minimum of inductance in the path between the reference or ground plane and the reference bus bar and allows all contacts of the connector structure to be utilized for circuit leads other than the reference potential. In another arrangement in accordance with the principles of the invention, a bar and a spring structure are positioned on each side of the card to balance the forces thereon. For providing additional ground connections to sources external to the card, a plurality of ground plane connectors may be mounted on the spring structure.

The novel features of this invention as well as the invention itself, both as to its organization and method of operation, will best be understood from the accompanying description, taken in connection with the accompanying drawings, in which like reference characters refer to like parts, and in which.

Figure 1:
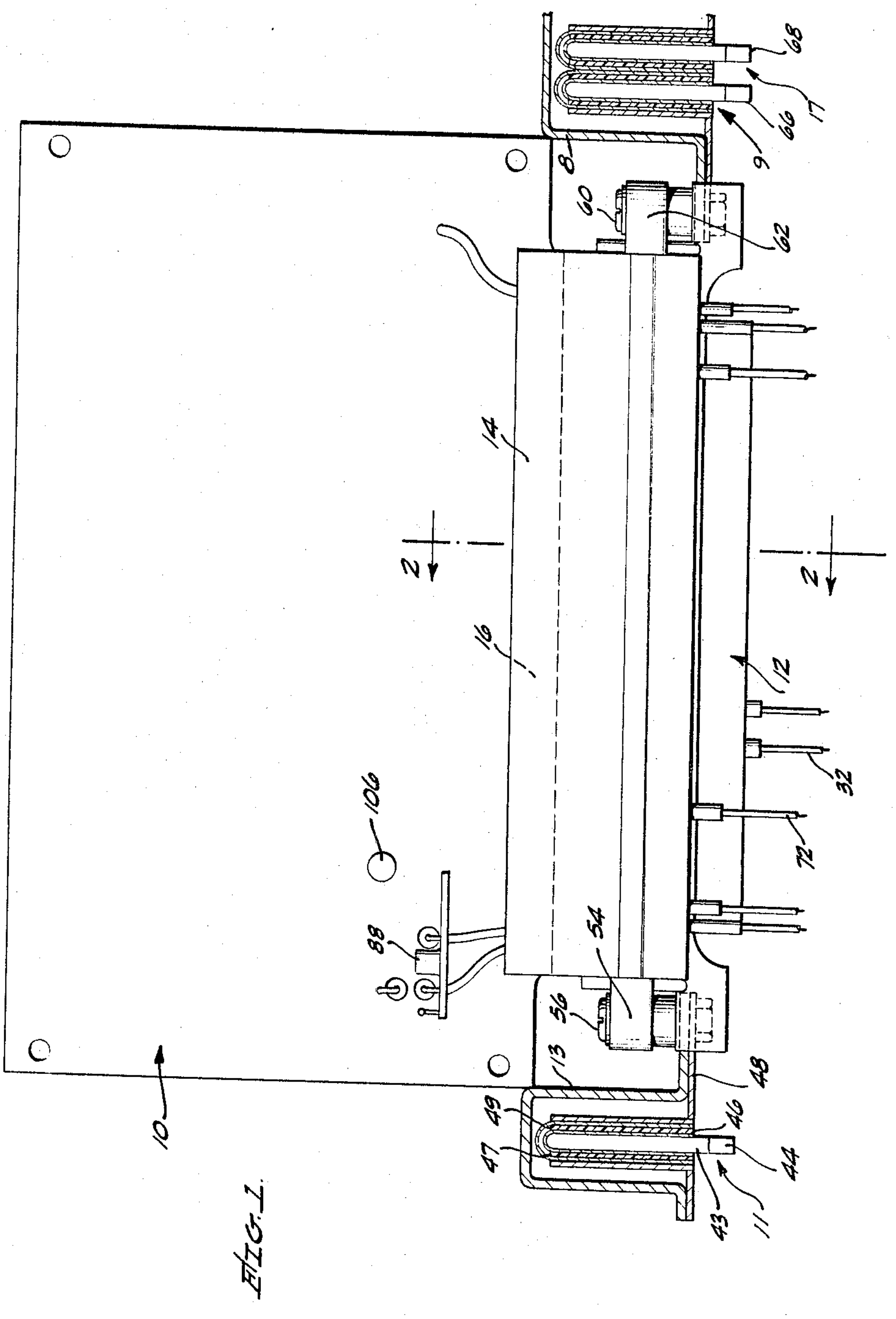
FIG. 1 is a plan view of the connector and circuit card system in accordance with the principles of the invention.
Figures 2, 3, 4:
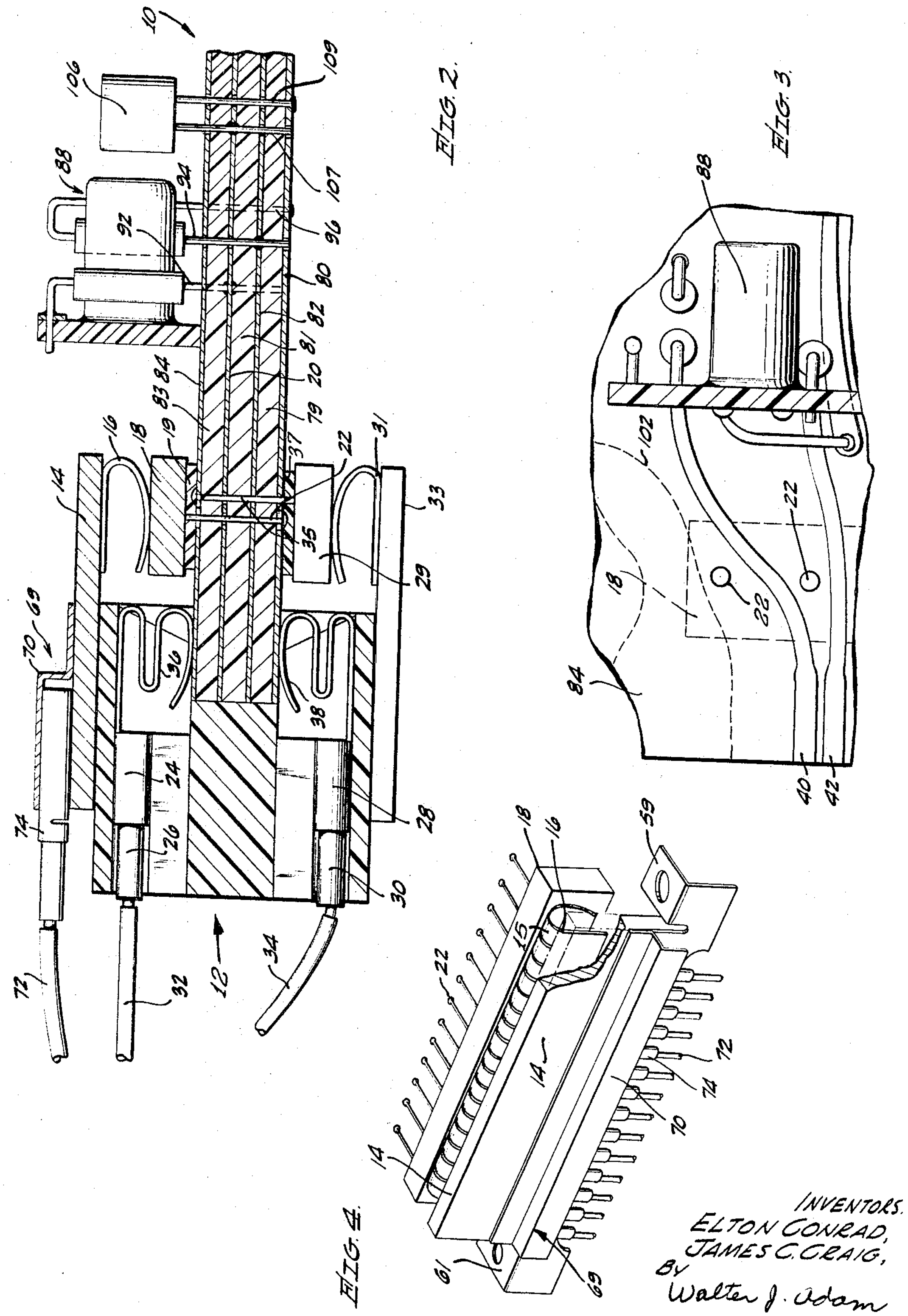
FIG. 2 is a sectional view taken at line 2—2 of FIG. 1.
FIG. 3 is a plan view of a portion of the card of FIG. 1 for further explaining the arrangement of the ground plane.
FIG. 4 is a perspective view of a single spring structure and reference plane bar with a portion partially broken away for further clarity.

Referring first to the plan view of FIG. 1, a printed circuit card 10 is shown removably mounted in position to a connector structure 12 which in turn is coupled to suitable frame channels 13 and 8 respectively including transmission line 11 and transmission lines 9 and 17 for supplying required DC voltages to circuit elements of the card. As shown in the section of FIG. 2 and the perspective drawing of FIG. 4, the mounting structure 12 includes a plate 14 having an elongated spring structure 16 connected thereto by soldering, for example. The spring structure 16 extends along a substantial portion of the width of the plate 14 and may have a plurality of separate extensions or fingers therealong such as an extension 15 shown in FIG. 4. A conducting bar 18 which may be of copper coated with gold, for example, extends along a substantial portion of the width of the card 10 and is connected to a ground plane 20 by a plurality of pins such as 22. A spacing bar 19 may be provided under the bar 18 or removed therefrom. The mounting structure 12 may include a plate 33 having an elongated spring structure 31 connected thereto in a manner similar to that described previously for the plate 14 and the spring structure 16. A conducting bar 29 extends along a substantial portion of the width of the other side of the card 10 and the structure 12. A spacing bar 37 which may be of a .032-inch thick Teflon may be provided between the card 10 and the bar 29. The bar 29 may be mounted to the ground plane 20 with a separate pin 35, for example. It is to be noted that utilizing bars on both sides of the card 10 has an advantage of balancing the forces applied to the card. However, it will be obvious to those skilled in the art that in accordance with the principles of the invention that the plate, conducting bar and elongated spring structure on one side of the card 10 may be eliminated. The scope of the invention includes connectors with a conducting bar and elongated spring on one or on both sides of the card. The connector 12 which is a conventional type well known in the art, includes a plurality of connector openings or contact holes 24 and insertion pins 26 at one side and a plurality of connector openings or contact holes 28 and insertion pins 30 at the other side thereof. A plurality of wires such as 32 and 34 are included with each being connected to a specific connector pin. Each connector opening such as 24 and 28 is suitably connected to respective spring structures such as 36 and 38 which in turn contact portions of the printed circuit of the card 10 such as contact strips or etched fingers 40 and 42. (FIG. 3) at the end thereof. Each of the connector pins such as 26 or 30 thus supplies a specific source of potential or a signal, for example, to the card 10. The transmission line such as 11 has a bus bar 43 with connecting tabs such as 44 therealong for supplying a voltage which may be a DC voltage level to the leads such as 32 or 34. The ground or reference voltage level may be supplied by the transmission line 11 which is in electrical contact through a thin sheet of copper foil 49 with an angle 48 which in turn is mounted on the structural channel 13 and electrically connected to the plate 14. To provide a transmission line effect, a suitable dielectric sheet 47 is positioned between a copper sheet 46 and the copper sheet 49. The transmission line arrangement allows a consistent spacing to be maintained between the sheets 46 and 49. The bar 43 which is in electrical connection with the sheet 46 conducts the majority of the current. The plate 14 has a connecting portion 59 at one end through which a suitable bolt 56 provides an electrical ground connection to the angle 48 and a structural connection to the frame such as the channel 13. A similar arrangement is provided at the transmission lines 9 and 17 with the ground path from both transmission lines being electrically connected by a bolt 60 to a connecting portion 61. Circular portions 54 and 62 of the connector 12 may be of plastic or Bakelite material as is well known in the art. It is to be noted that each of the transmission lines such as 9 and 17 includes DC bus bars 66 and 68, respectively, each supplying a different DC voltage level to be connected to wires such as 32 and 34. Also in accordance with the principles of the invention, a plurality of ground plane connector openings 70 of a connector structure 69 are electrically connected to the plate 14 for connection of pins such as 74 which are in turn connected to external ground wires such as 72. A connector structure (not shown) similar to the structure 69 may also be provided at the plate 33 in accordance with the invention. The ground wires such as 72 may be utilized for twisting a ground wire with other wires throughout the electrical equipment for eliminating the formation of transient magnetic fields, for example.

Referring now principally to the printed circuit card

10, voltage reference planes 80, 82 and 84 may be provided, each carrying a predetermined reference potential as supplied through selected ones of the connecting strips 40 and 42 and the connecting springs 36 and 38. For example, a circuit element 88 may be connected to the ground plane 20, the plane 82 and to the plane 80 respectively through pins 92, 94 and 96. Sheets of suitable material such as epoxy sheets 79, 81 and 83 are positioned respectively between the planes 80 and 82, between the planes 82 and 20 and between the planes 20 and 84. As is well known in the art, each plane such as 80, 82, 20 and 84 has an etched plane configuration so that each of the pins passes through three of the layers without connecting thereto and while being connected to one desired layer. The outer planes such as 84 have an etched configuration as shown in FIG. 3 to form the etched contact strips or fingers such as 40 and 42. As indicated by a line 102 which may represent the configuration of the reference plane 20, pins such as 22 are in contact therewith while not being in electrical contact with the other three planes. In some arrangements in accordance with the principles of the invention a storage capacitor 106 may be provided between each DC level and ground level for supplying energy during switching operations. For example, the capacitor 106 is connected to the ground plane 20 and to the plane 80 with respective pins 107 and 109 for supplying energy to the latter plane. Other storage capacitors (not shown) may either be included in the card 10 or on other cards throughout the system so that sufficient energy is stored at each DC voltage level.

To explain one method of forming the card 10 as is well known in the art, sheets 79 and 83 of epoxy glass which may be 4 mils in thickness, for example, and coated on both sides in a double clad arrangement with a conductive sheet such as 3-ounce copper, for example, may be utilized. The inner surfaces 20 and 82 of the completed card are first etched prior to lamination of the three glass sheets 79, 81 and 83. The epoxy glass sheet 81 does not have a conductive surface thereon and is utilized for separation of the planes 20 and 82. The etching of each copper surface may be performed by utilizing conventional techniques such as by forming patterns for each surface having configurations so that each of the pins will connect only to the proper surface. The patterns to be utilized with the outer surfaces have configurations to provide the proper connections such as shown in FIG. 3. With the pattern in position, the copper surface which is coated with a suitable photosensitive material, as is well known in the art, is then exposed to light until it is sufficiently sensitized. A resist material which may be a suitable combination of lacquer and asphalt is then applied to the copper surface and only the sensitized portion of the copper is coated. For example, a photo resist material "KPR" of the Eastman Kodak Company may be utilized. A gold plating operation is then performed with the gold being deposited only on the portion not coated with the resist material. The next step in the operation is to wash off the resist material leaving the gold pattern on the copper sheet. The exposed copper is then etched or removed from the surface of the glass by an acid bath which may include ferric chloride or ammonium per sulphate, for example. As a result of this etching operation, only the gold pattern remains on the surface of the epoxy sheet. This etching operation is performed on each inner copper surface of the epoxy sheets 79 and 83. The three glass sheets 79, 81 and 83 are then laminated with an epoxy base glue and with sufficient pressure and heat. The outer sheets 80 and 84 are then etched in a manner similar to that discussed above.

Prior to any of the etching operations, all pin holes are drilled in the sheets utilizing a drill template, for example. Copper is then plated on the inside of the holes of 1 mil thickness, for example. Thus, in the portions of the layers in which a gold pattern is formed on the surface, a gold pattern is also formed in the holes.

After etching and lamination is completed, all components such as 88 and the bar 18 are positioned with their connecting pins passing through the holes in the card 10. The bar 18 may be formed of gold plated copper and the pins such as 22 and 92 may be of a hard copper material. A suitable brazing powder may be applied to each of the pins before being inserted through the holes drilled in the card 10. Solder is then flowed completely over one side of the card such as over the surface 84 for connecting the pins to adjacent layers of gold. The solder adheres to the gold pattern on the surface, a portion of which is shown in FIG. 3, but is unable to adhere to the glass. In the drilled holes the solder adheres to the gold to provide connection with any layer or plane thereat. Thus each pin such as 22 is connected to the proper gold and copper layer such as the ground plane 20 but not to the planes 80, 82 and 84. It is to be noted that in the above soldering operation the portions of the plane 84 that have not previously been removed by etching are covered with solder on the surface without affecting the electrical characteristics of the card. The spacing bar 19 may be of a .032-inch thick Teflon to reduce the capacitance between the bar and the plane 84 and to provide electrical isolation therefrom. It is to be understood that the illustrated card arrangement is only one of a plurality of types that may be utilized and the connector principles of the invention are applicable to other types of printed or etched circuits or cards.

The connector system of the invention thus provides a minimum impedance to signals at all frequencies flowing between the ground plane 20 and the reference ground potential source of the transmission lines 11, 9 and 17. As the inductive impedance increases as a function of frequency, the low impedance has a highly desirable effect during rapid circuit operation by allowing the relatively high frequency signals to pass therethrough with a minimum of attenuation. The large mass of the bar 18 and the continuous connection of the spring structure 16 which is curved in an ellipsoid or circular configuration to contact the bar 18, and of the plate 14 provides the low impedance to ground. Sufficient pins such as 22 are utilized between the bar 18 and the ground plane 20 to provide a low impedance path thereat. The ground connector structure 69 allows additional external ground connections to be provided. It is to be noted that although the connector is illustrated as a ground connector the principles of the invention are equally applicable to connecting other signal and other potential levels. Because of the ground bar 18, the connecting pin openings such as 24 and 28 are not required for ground connections. As a result, a maximum of density of circuit elements may be utilized in each card. Another advantage of the connector in accordance with the invention is that the card is readily removable without disconnecting any wires. The connector system of the invention increases the rise and fall times of pulses to allow a computer, for example, to operate at a relatively high clock rate.

What is claimed is:

1. A connector for a printed circuit card removably positioned in a mounting structure, said card having a reference plane of conductive material therein comprising
   an elongated bus bar positioned along the surface of the card,
   a plurality of pins connecting said bus bar to the reference plane,
   and an elongated sheet of conductive material fixed on the mounting structure and contacting said bus bar substantially along the length thereof.

2. A connector for connecting a printed circuit card to a source of potential having printed circuit conductors thereon at a first edge to individually engage contacts of a connecting structure, said card having a plane of conducting material therein to form a reference plane comprising
   a bus bar mounted on the card at the first edge,
   a plurality of pins connecting said bus bar and the plane,
   a curved sheet of spring material slideably contacting said bus bar,
   and means connecting said bus bar to the source of potential.

3. A connector for electrically connecting a printed circuit board to a source of reference potential, said board having a layer of conducting material therein to form a reference plane comprising
   an elongated bar positioned parallel to the surface of the printed board,
   a plurality of conducting pins connected between said bar and the reference plane,
   an elongated spring structure movably positioned substantially along the length of said bar,
   and means fixedly connecting said spring structure to said source of reference potential.

4. A connector for providing a connection between a source of reference potential and a conductive reference plane of a printed circuit card, the card having a plurality of contacts at a first edge thereof and movably contacting connectors of a connecting structure comprising
   an elongated bus bar positioned substantially parallel to said first edge along the surface of said card and at a selected distance from said surface,
   a plurality of pins connecting said bus bar to the reference plane,
   and an elongated sheet of conductive material mounted to said connecting structure and connected to said source of reference potential, said sheet having a plurality of finger extensions movably contacting said bus bar substantially along the length thereof.

5. A reference connector for use with a printed circuit board having a plurality of printed circuit strips at one end thereof and removably connecting to a plurality of individual contacts of a connector structure, said board having a plurality of planes of conductive material with one being a reference plane, said plurality of planes other than said reference plane being connected to predetermined ones of said plurality of printed circuit strips comprising
   an elongated bar positioned along the surface of said card and separated therefrom,
   a plurality of conductive pins connected between said bar and said reference plane,
   and an elongated spring sheet mounted on said connector structure and having a plurality of curved finger extensions contacting said bar substantially along the length thereof when said board is inserted into said connecting structure.

6. A ground connector for a printed circuit card having a plurality of strips at a first edge thereof and removably contacting a plurality of individual contacts of a connector structure, said card having a plurality of planes of conductive material with a selected one being a ground plane, said card having a plurality of circuit elements thereon, the plurality of circuit elements and planes other than the ground plane being connected to said plurality of strips comprising
   an elongated bar of conductive material positioned along the surface of said bar parallel to said first edge and separated from said card by a selected distance,
   a plurality of conductive pins connected between said bar and said reference plane,
   an elongated spring sheet mounted on said connector structure and having a plurality of finger extensions contacting said bar substantially along the length thereof when said card is positioned with said strips contacting said plurality of individual contacts,
   and a plurality of pin mounting openings connected to said spring sheet.

7. A connector for a printed circuit card removably positioned in a mounting structure, said card having a reference plane of conductive material therein comprising first and second elongated bus bars positioned along the surface of the card, a plurality of pins connecting said bus bars to the reference plane, and first and second elongated sheets of conductive material fixed on the mounting structure and respectively contacting said first and second bus bars substantially along the length thereof.

References Cited

UNITED STATES PATENTS

| | | | |
|---|---|---|---|
| 2,006,436 | 7/1935 | Bowers | 339—18 |
| 2,623,981 | 12/1952 | Anderson et al. | 339—252 X |
| 2,825,042 | 2/1958 | Tollefson et al. | 339—253 |
| 2,879,458 | 3/1959 | Schubert | 339—18 X |
| 3,049,645 | 8/1962 | Skirpan | 339—18 X |

MARVIN A. CHAMPION, *Primary Examiner.*

PATRICK A. CLIFFORD, *Examiner.*